(12) United States Patent
Nardacci et al.

(10) Patent No.: US 10,241,967 B2
(45) Date of Patent: *Mar. 26, 2019

(54) GOLF BALL DIMPLES DEFINED BY SUPERPOSED CURVES

(71) Applicant: Acushnet Company, Fairhaven, MA (US)

(72) Inventors: Nicholas M. Nardacci, Bristol, RI (US); Michael R. Madson, Easton, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,898

(22) Filed: Jan. 18, 2016

(65) Prior Publication Data

US 2016/0129314 A1 May 12, 2016

Related U.S. Application Data

(63) Continuation-in-part of application No. 13/433,337, filed on Mar. 29, 2012, now abandoned, which is a continuation-in-part of application No. 13/341,652, filed on Dec. 30, 2011, now abandoned.

(51) Int. Cl.
*A63B 37/06* (2006.01)
*G06F 17/10* (2006.01)
*A63B 37/00* (2006.01)

(52) U.S. Cl.
CPC ......... *G06F 17/10* (2013.01); *A63B 37/0003* (2013.01); *A63B 37/0012* (2013.01); *A63B 37/002* (2013.01); *A63B 37/0018* (2013.01); *A63B 37/0019* (2013.01); *A63B 37/0021* (2013.01)

(58) Field of Classification Search
CPC .................................................. A63B 37/0012
USPC ......................................................... 473/378
See application file for complete search history.

(56) References Cited

U.S. PATENT DOCUMENTS

| | | | |
|---|---|---|---|
| 5,713,801 A | 2/1998 | Aoyama | |
| 5,803,831 A | 9/1998 | Sullivan et al. | |
| 5,885,172 A | 3/1999 | Hebert et al. | |
| 6,464,601 B2 * | 10/2002 | Ogg | A63B 37/0004 |
| | | | 473/383 |
| 6,702,696 B1 | 3/2004 | Nardacci | |
| 6,849,007 B2 | 2/2005 | Morgan et al. | |
| 6,969,327 B2 | 11/2005 | Aoyama et al. | |
| 7,179,178 B2 | 2/2007 | Veilleux et al. | |
| 7,258,632 B2 | 8/2007 | Aoyama et al. | |
| 7,422,529 B2 | 9/2008 | Aoyama et al. | |
| 7,927,234 B2 | 4/2011 | Aoyama | |
| 8,137,217 B2 | 3/2012 | Madson et al. | |
| 9,861,859 B2 * | 1/2018 | Nardacci | A63B 37/0006 |
| 9,868,031 B2 * | 1/2018 | Nardacci | A63B 37/0006 |
| 9,868,032 B2 * | 1/2018 | Nardacci | A63B 37/0006 |
| 2006/0025245 A1 | 2/2006 | Aoyama et al. | |
| 2010/0240474 A1 | 9/2010 | Madson et al. | |

* cited by examiner

*Primary Examiner* — Raeann Gorden
(74) *Attorney, Agent, or Firm* — Mandi B. Milbank

(57) ABSTRACT

The present invention is a golf ball which comprises dimples having a cross-sectional shape defined by the superposition of a weighted profile and one or more additional profiles, and a method of making such dimples. The dimples preferably have a circular boundary and maintain an axis coincident with the center of the circular boundary.

11 Claims, 9 Drawing Sheets

GOLF BALL DIMPLES DEFINED BY SUPERPOSED CURVES

CROSS-REFERENCE TO RELATED APPLICATIONS

This application is a continuation-in-part of U.S. patent application Ser. No. 13/433,337, filed Mar. 29, 2012, which is a continuation-in-part of U.S. patent application Ser. No. 13/341,652, filed Dec. 30, 2011, now abandoned, the entire disclosures of which are hereby incorporated herein by reference.

FIELD OF THE INVENTION

The present invention is directed to a golf ball dimple cross-sectional shape defined by the superposition of a weighted profile and one or more additional profiles, and a method of making such dimples.

BACKGROUND OF THE INVENTION

Golf balls were originally made with smooth outer surfaces. In the late nineteenth century, players observed that the gutta-percha golf balls traveled further as they got older and more gouged up. The players then began to roughen the surface of new golf balls with a hammer to increase flight distance. Manufacturers soon caught on and began molding non-smooth outer surfaces on golf balls.

By the mid 1900's, almost every golf ball being made had 336 dimples arranged in an octahedral pattern. Generally, these balls had about 60 percent of their outer surface covered by dimples. Over time, improvements in ball performance were developed by utilizing different dimple patterns. In 1983, for instance, Titleist introduced the TITLEIST 384, which, not surprisingly, had 384 dimples that were arranged in an icosahedral pattern. About 76 percent of its outer surface was covered with dimples and the golf ball exhibited improved aerodynamic performance. Today, dimpled golf balls travel nearly two times farther than a similar ball without dimples.

The dimples on a golf ball are important in reducing drag and increasing lift. Drag is the air resistance that acts on the golf ball in the opposite direction from the ball flight direction. As the ball travels through the air, the air surrounding the ball has different velocities and, thus, different pressures. The air exerts maximum pressure at the stagnation point on the front of the ball. The air then flows over the sides of the ball and has increased velocity and reduced pressure. At some point it separates from the surface of the ball, leaving a large turbulent flow area called the wake that has low pressure. The difference in the high pressure in front of the ball and the low pressure behind the ball slows the ball down. This is the primary source of drag for a golf ball.

The dimples on the ball create a turbulent boundary layer around the ball, i.e., a thin layer of air adjacent to the ball flows in a turbulent manner. The turbulence energizes the boundary layer of air around the ball and helps it stay attached further around the ball to reduce the area of the wake. This greatly increases the pressure behind the ball and substantially reduces the drag.

Lift is the upward force on the ball that is created from a difference in pressure on the top of the ball to the bottom of the ball. The difference in pressure is created by a warpage in the air flow resulting from the ball's back spin. Due to the back spin, the top of the ball moves with the air flow, which delays the separation to a point further aft. Conversely, the bottom of the ball moves against the air flow, moving the separation point forward. This asymmetrical separation creates an arch in the flow pattern, requiring the air over the top of the ball to move faster, and thus have lower pressure than the air underneath the ball.

Almost every golf ball manufacturer researches dimple patterns in order to improve the aerodynamic forces on the ball during flight and increase the distance traveled by a golf ball. A high degree of dimple coverage is generally beneficial to flight distance, but only if the dimples are of preferred size and shape. For example, dimple coverage gained by filling spaces with tiny dimples is generally not very effective, since tiny dimples are not good turbulence generators.

In addition to researching dimple pattern and size, golf ball manufacturers also study the effect of dimple shape, volume, and cross-section on overall flight performance of the ball. One example is U.S. Pat. No. 5,737,757, which discusses dimples using two different spherical radii with an inflection point where the two curves meet. In most cases, however, the cross-sectional profiles of dimples in prior art golf balls are parabolic curves, ellipses, semi-spherical curves, saucer-shaped, a sine curve, a truncated cone, or a flattened trapezoid. One disadvantage of these shapes is that they can sharply intrude into the surface of the ball, which may cause the drag to become greater than the lift. As a result, the ball may not make best use of momentum initially imparted thereto, resulting in an insufficient carry of the ball. Despite all the cross-sectional profiles disclosed in the prior art, there has been no disclosure of a golf ball having dimples with a cross-sectional shape defined by the superposition of a weighted profile and one or more additional profiles.

SUMMARY OF THE INVENTION

In one embodiment, the present invention is directed to a golf ball having a surface with a plurality of recessed dimples thereon, wherein the dimples have a cross-section defined by the superposition of a weighted profile and one or more additional profiles. In a particular aspect of this embodiment, the weighted profile is the product of a base profile and at least one weighting function wherein the base profile is defined by a single function. In another particular aspect of this embodiment, the weighted profile is the product of a base profile and at least one weighting function wherein the base profile is defined by a single continuous, differentiable function.

BRIEF DESCRIPTION OF THE DRAWINGS

In the accompanying drawings, which form a part of the specification and are to be read in conjunction therewith, and which are given by way of illustration only, and thus are not meant to limit the present invention.

DETAILED DESCRIPTION OF THE INVENTION

Figure 1:
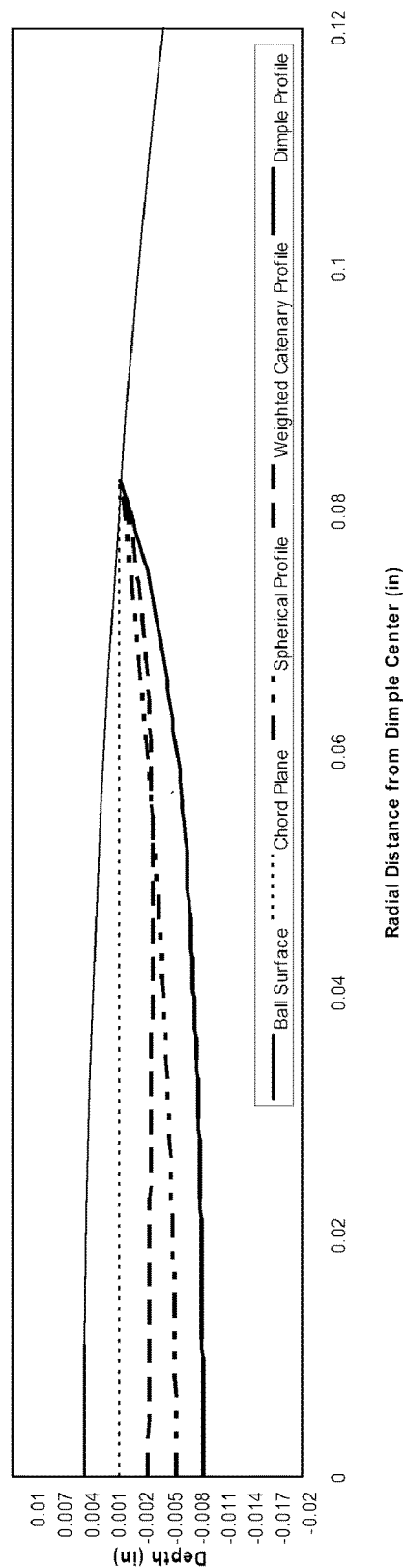
FIG. 1 shows a dimple cross-sectional profile defined by the superposition of a spherical profile and weighted catenary profile according to one embodiment of the present invention.
Figure 2:
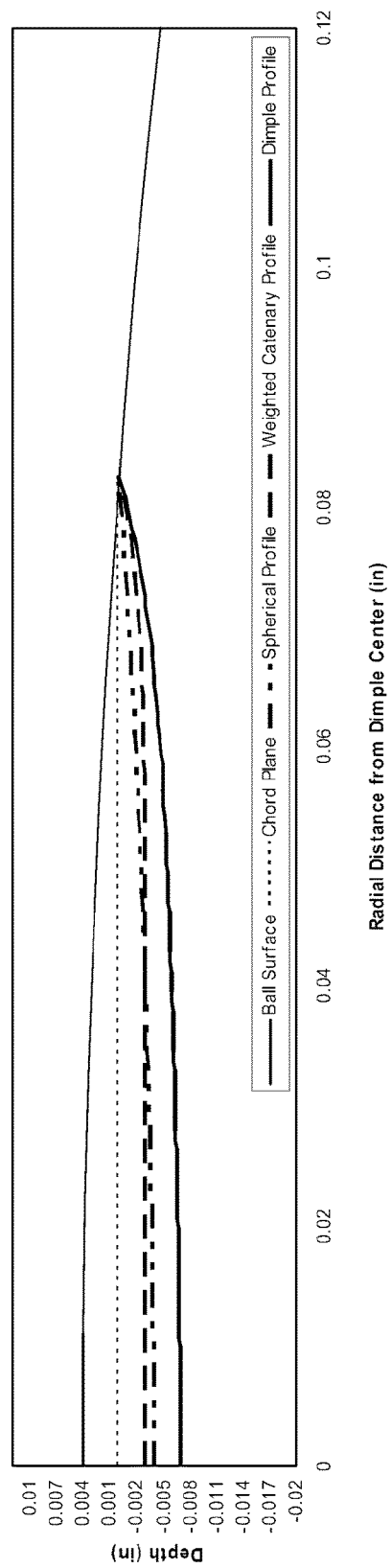
FIG. 2 shows a dimple cross-sectional profile defined by the superposition of a spherical profile and a weighted catenary profile according to another embodiment of the present invention.
Figure 3:
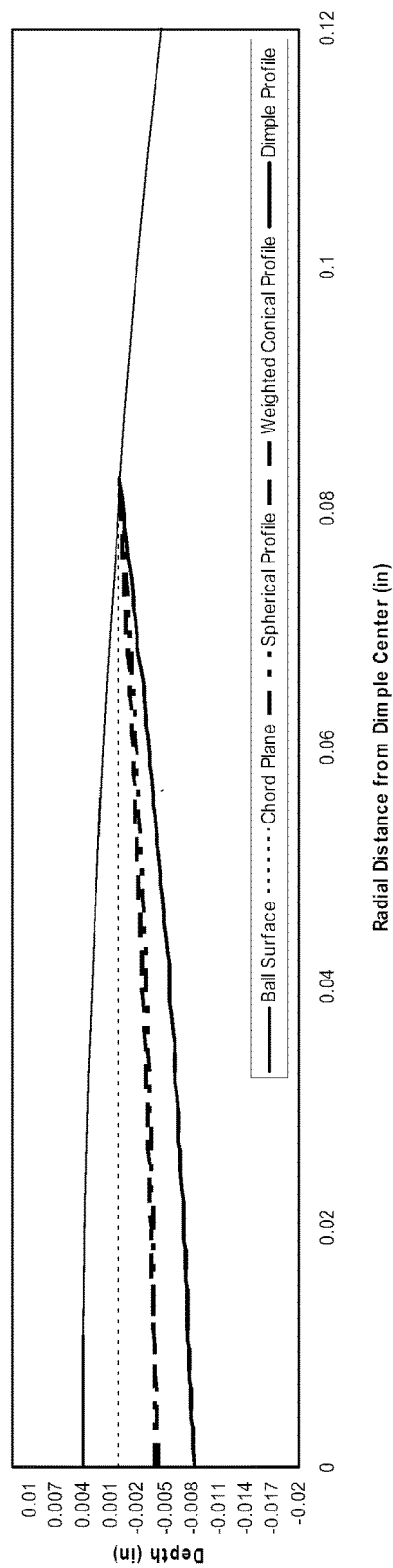
FIG. 3 shows a dimple cross-sectional profile defined by the superposition of a spherical profile and a weighted conical profile according to another embodiment of the present invention.
Figure 4:
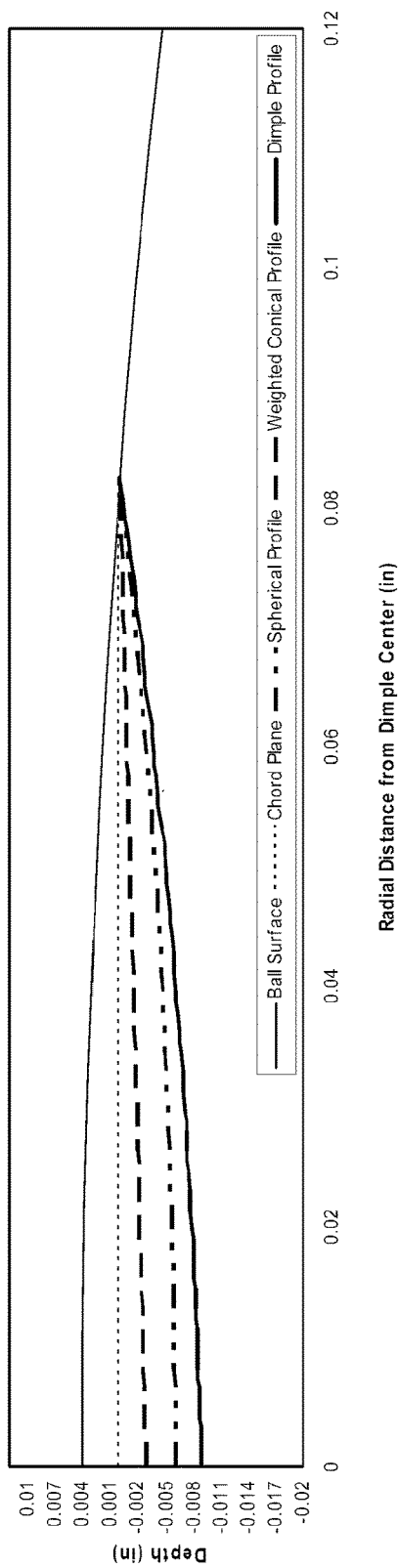
FIG. 4 shows a dimple cross-sectional profile defined by the superposition of a spherical profile and a weighted conical profile according to another embodiment of the present invention.
Figure 5:
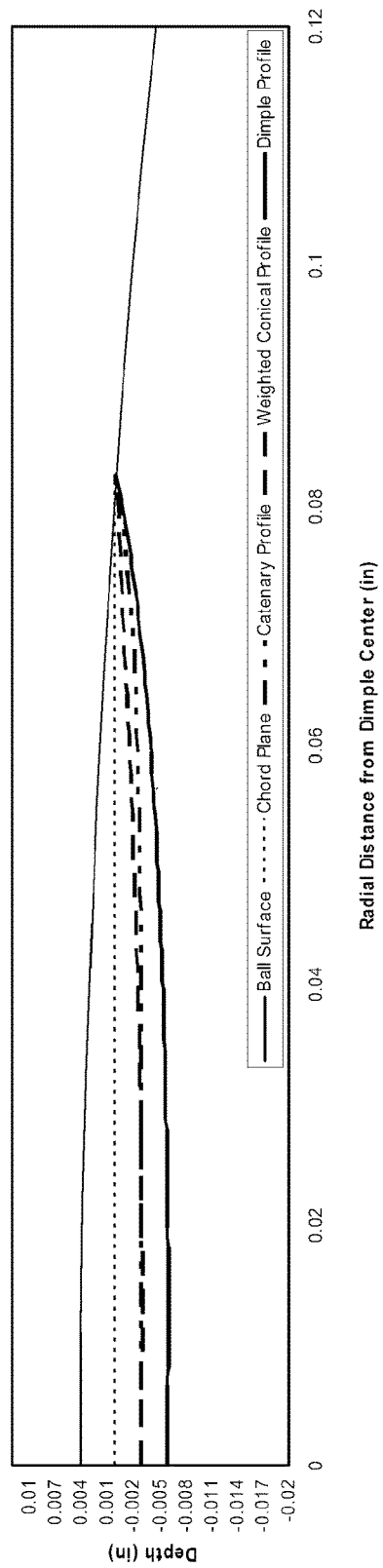
FIG. 5 shows a dimple cross-sectional profile defined by the superposition of a catenary profile and a weighted conical profile according to another embodiment of the present invention.
Figure 6:
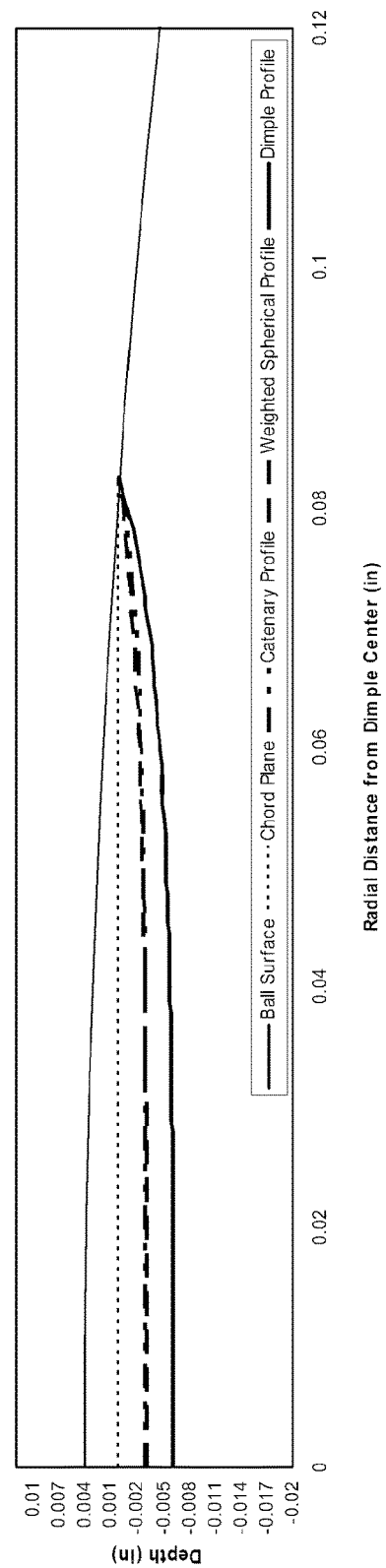
FIG. 6 shows a dimple cross-sectional profile defined by the superposition of a catenary profile and a weighted spherical profile according to another embodiment of the present invention.
Figure 7:
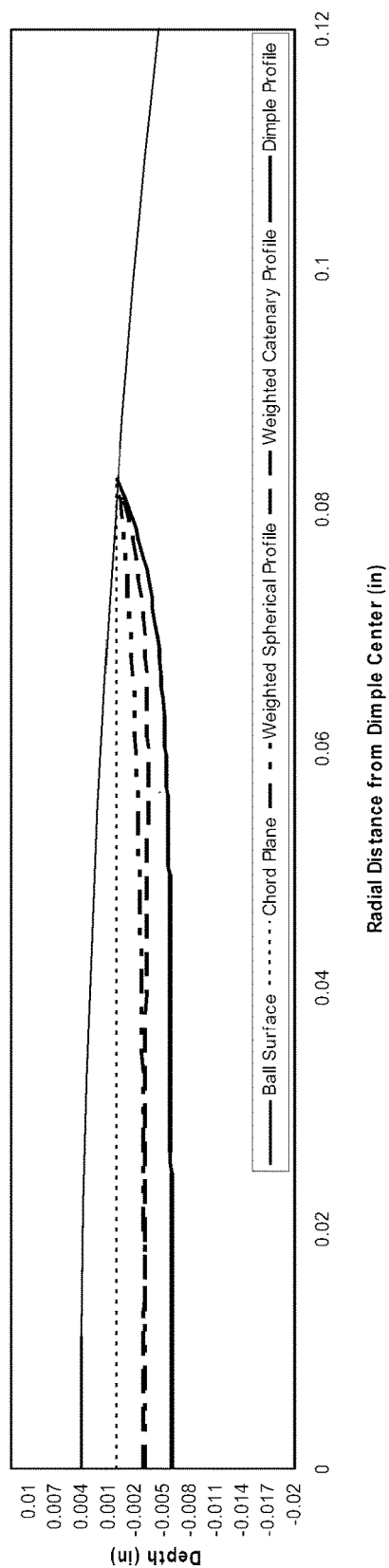
FIG. 7 shows a dimple cross-sectional profile defined by the superposition of a weighted spherical profile and a weighted catenary profile according to another embodiment of the present invention.
Figure 8:
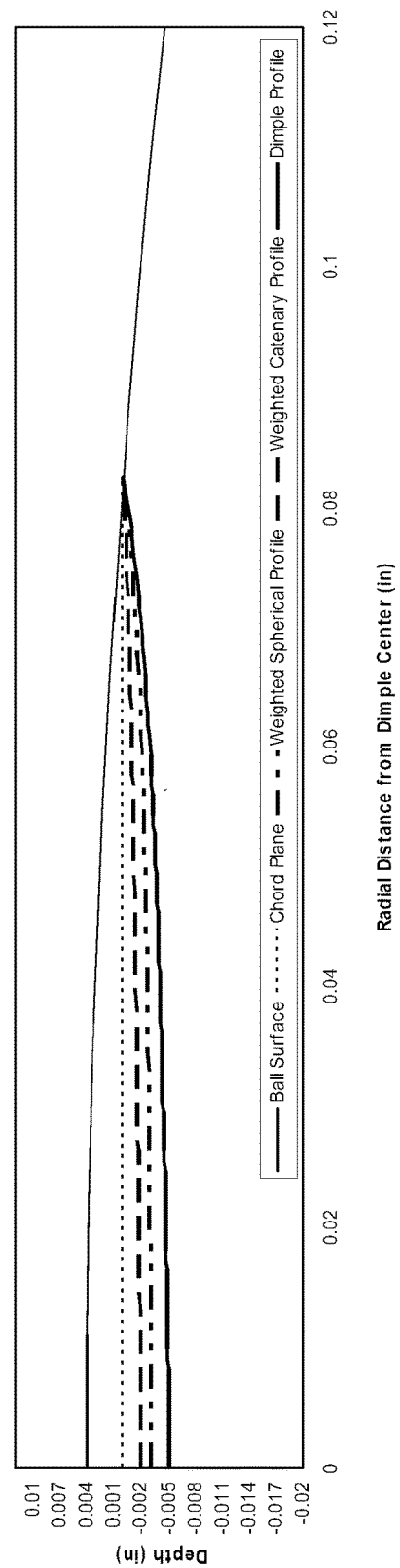
FIG. 8 shows a dimple cross-sectional profile defined by the superposition of a weighted spherical profile and a weighted catenary profile according to another embodiment of the present invention.

The present invention is directed to a golf ball which comprises dimples having a cross-sectional shape defined by the superposition of a weighted profile and one or more additional profiles. The weighted profile is the product of a base profile and at least one weighting function. Each additional profile can be an un-weighted or a weighted profile. In embodiments of the present invention wherein the cross-sectional shape is defined by the superposition of at least two weighted profiles, the base profile of one weighted profile can be the same as or different from the base profile of another weighted profile, and the weighting function of one weighted profile can be the same as or different than the weighting function of another weighted profile.

Suitable profiles for use as an un-weighted profile or as the base profile of a weighted profile include those that can be defined by a single function, including, but not limited to, spherical, conical, catenary, elliptical, polynomial, Witch of Agnesi, frequency, Neiles parabola, and trigonometric profiles, and those that are defined by two or more functions, including, but not limited to, profiles comprising a top conical edge and a bottom spherical cap. Profiles comprising a top conical edge and a bottom spherical cap are further disclosed, for example, in U.S. Patent Application Publication No. 2010/0240474, the entire disclosure of which is hereby incorporated herein by reference.

Typical weighting function forms include, but are not limited to, polynomial, exponential, and trigonometric and linear combinations thereof.

In a particular embodiment, the present invention is directed to dimples having a cross-sectional shape defined by the superposition of a weighted profile and one or more additional profiles, wherein the weighted profile is the product of a base dimple profile defined by a single continuous, differentiable function, and a continuous weighting function, resulting in a continuous, differentiable weighted dimple profile. In a particular aspect of this embodiment, each of the one or more additional profiles is defined by a single continuous, differentiable function.

Weighted profiles are further disclosed in U.S. patent application Ser. No. 13/341,652, filed Dec. 30, 2011, the entire disclosure of which is hereby incorporated herein by reference.

Non-limiting examples of particularly suitable weighting functions are shown in Table 1 below.

TABLE 1

| Example No. | Weighting Function |
|---|---|
| 1 | $w = 1$ |
| 2 | $w = x$ |
| 3 | $w = x^2$ |
| 4 | $w = x^3$ |
| 5 | $w = x^4$ |
| 6 | $w = x^4 + x^3$ |
| 7 | $w = x^2/5 + 3x^3 + x^4$ |
| 8 | $w = 10x^2 + 3x^4$ |
| 9 | $w = 3x^4 + x^3/2 + 10x$ |
| 10 | $w = -x$ |
| 11 | $w = -x^3$ |
| 12 | $w = x^3 - x^4 - 2x$ |
| 13 | $w = \sin(x)$ |
| 14 | $w = \cos(x)$ |
| 15 | $w = -x^5$ |
| 16 | $w = e^x$ |
| 17 | $w = -e^x$ |
| 18 | $w = (-e^{2x})\sin(x)$ |
| 19 | $w = e^{2x}x^3$ |

FIGS. 1-8 show the dimple cross-sections resulting from the superposition of a weighted profile and one additional profile. In each figure, the individual profiles are shown along with the final dimple profile. FIGS. 1-8 show various combinations of weighted base profiles and one additional profile. The figures consider a golf ball with a diameter of 1.680 inches and a dimple diameter of 0.165 inches. The base profiles and weighting functions used to create the superposed profile along with chord depth, chord volume and equivalent spherical edge angle of the final profile are tabularized in Table 2. Weighting functions are numerically referenced from Table 1.

TABLE 2

| FIG. | Base profile | Weighting Function | Base Profile | Weighting Function | Chord Depth (inch) | Chord Vol (in³) | Effective Edge Angle (degs) |
|---|---|---|---|---|---|---|---|
| 1 | Spherical | none | Catenary | 19 | 0.0090 | 1.2284E−04 | 21.43 |
| 2 | Spherical | none | Catenary | 7 | 0.0069 | 9.2868E−05 | 17.57 |
| 3 | Spherical | none | Conical | 19 | 0.0082 | 7.6391E−05 | 15.45 |
| 4 | Spherical | none | Conical | 2 | 0.0089 | 8.5137E−05 | 16.57 |
| 5 | Catenary | none | Conical | 14 | 0.0059 | 8.1103E−05 | 16.05 |

TABLE 2-continued

| FIG. | Base profile | Weighting Function | Base Profile | Weighting Function | Chord Depth (inch) | Chord Vol (in³) | Effective Edge Angle (degs) |
|---|---|---|---|---|---|---|---|
| 6 | Catenary | none | Spherical | 9 | 0.0061 | 9.0453E−05 | 17.26 |
| 7 | Spherical | 5 | Catenary | 5 | 0.0061 | 1.0184E−04 | 18.73 |
| 8 | Spherical | 5 | Catenary | 13 | 0.0051 | 6.1605E−05 | 13.54 |

In each figure, the individual profiles are shown along with the final dimple profile. FIGS. 1-8 show various combinations of weighted base profiles and one additional profile. The figures consider a golf ball with a diameter of 1.680 inches and a dimple diameter of 0.165 inches. The base profiles and weighting functions used to create the superposed profile along with chord depth, chord volume and equivalent spherical edge angle of the final profile are tabularized in Table 2. Weighting functions are numerically referenced from Table 1.

Figure 9:
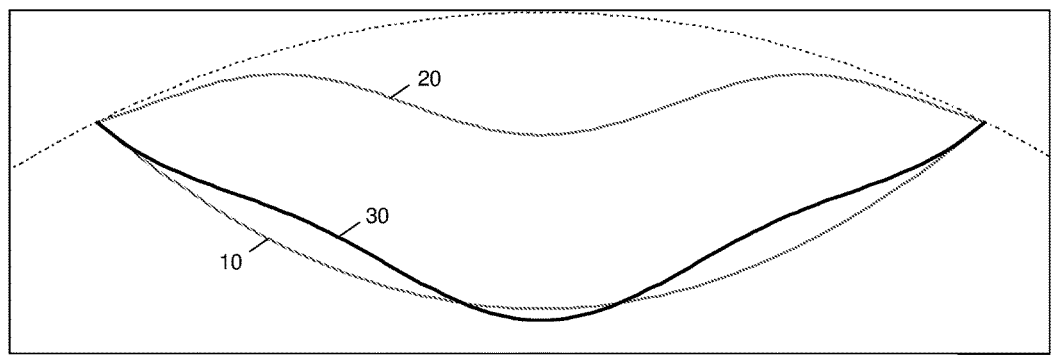
FIG. 9 shows a dimple cross-sectional profile defined by the superposition of a weighted spherical profile and a weighted cosine profile according to another embodiment of the present invention.
Figure 10:
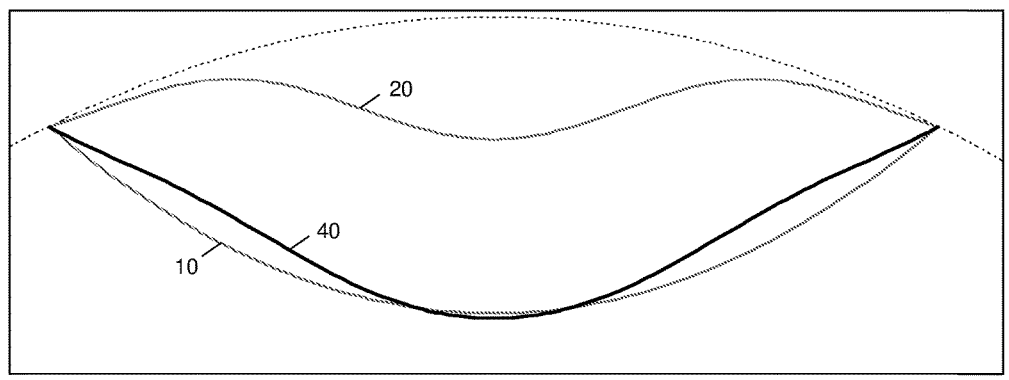
FIG. 10 shows a dimple cross-sectional profile defined by the superposition of a weighted spherical profile and a weighted cosine profile according to another embodiment of the present invention.

In one embodiment, the present invention is directed to a method of making a golf ball dimple cross-sectional profile. The method includes providing a base function selected from single continuous, differentiable functions; multiplying the single continuous, differentiable function by a weighting function to produce a weighted base function; and adding the weighted base function and one or more additional functions, each of which can be an un-weighted or weighted function, to produce the golf ball dimple cross-sectional profile. For example, as shown in FIG. 9, a spherical base function 10 is added to a cosine function 20 and the result is multiplied by a polynomial weighting function to produce a golf ball dimple cross-sectional profile 30. It should be noted that the golf ball dimple cross-sectional profile 30 is the same result as multiplying the spherical base function 10 by a polynomial weighting function to produce a weighted spherical function, and then adding the weighted spherical function and a weighted cosine function wherein the weighted cosine function is the multiplication product of the cosine function 20 and the polynomial weighting function. Similarly, as shown in FIG. 10, the spherical base function 10 is added to the cosine function 20 and the result is multiplied by an exponential weighting function to produce a golf ball dimple cross-sectional profile 40. It should be noted that the golf ball dimple cross-sectional profile 40 is the same result as multiplying the spherical base function 10 by an exponential weighting function to produce a weighted spherical function, and then adding the weighted spherical function and a weighted cosine function wherein the weighted cosine function is the multiplication product of the cosine function 20 and the exponential weighting function.

The present invention is not limited by any particular dimple pattern. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2006/0025245, 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos. 6,849,007 and 7,422,529, the entire disclosures of which are hereby incorporated herein by reference.

In a particular embodiment, the dimple pattern provides for overall dimple coverage of 60% or greater, or 65% or greater, or 75% or greater, or 80% or greater, or 85% or greater, or 90% or greater.

Golf balls of the present invention typically have a dimple count within a limit having a lower limit of 250 and an upper limit of 350 or 400 or 450 or 500. In a particular embodiment, the dimple count is 252 or 272 or 302 or 312 or 320 or 328 or 332 or 336 or 340 or 352 or 360 or 362 or 364 or 372 or 376 or 384 or 390 or 392 or 432.

The diameter of the dimples is preferably within a range having a lower limit of 0.090 inches or 0.100 inches or 0.115 inches or 0.125 inches and an upper limit of 0.185 inches or 0.200 inches or 0.225 inches.

The chord depth of the dimples is preferably within a range having a lower limit of 0.002 inches or 0.004 inches or 0.006 inches and an upper limit of 0.008 inches or 0.010 inches or 0.012 inches or 0.014 inches or 0.016 inches.

The present invention may be used with any type of ball construction. For instance, the ball may have a 2-piece construction, a double cover or veneer cover construction or other multi-layer constructions depending on the type of performance desired of the ball. Examples of these and other types of ball constructions that may be used with the present invention include those described in U.S. Pat. Nos. 5,713,801, 5,803,831, 5,885,172, 5,919,100, 5,965,669, 5,981,654, 5,981,658, and 6,149,535, with the construction and materials disclosed in the patents being expressly incorporated herein. Different materials also may be used in the construction of the golf balls made with the present invention. For example, the cover of the ball may be made of polyurethane, polyurea, ionomer resin, balata or any other suitable cover material known to those skilled in the art. Different materials also may be used for forming core and intermediate layers of the ball.

While the invention has been described in conjunction with specific embodiments, it is evident that numerous alternatives, modifications, and variations will be apparent to those skilled in the art in light of the foregoing description.

What is claimed is:

1. A golf ball having a plurality of recessed dimples on the surface thereof, wherein at least a portion of the recessed dimples have a non-spherical cross-sectional profile defined by a function $f(x)$ resulting from the sum of a weighted function and one or more additional functions $g(x)$, wherein the weighted function is the multiplication of a single continuous, differentiable function $b(x)$ and at least one weighting function $w(x)$ selected from the group consisting of polynomial, exponential, and trigonometric functions, such that the function defining the cross-sectional profile is expressed as $$f(x)=(b(x)*w(x))+g(x).$$

2. The golf ball of claim 1, wherein g(x) is a spherical function.

3. The golf ball of claim 1, wherein g(x) is a conical function.

4. The golf ball of claim 1, wherein g(x) is a catenary function.

5. The golf ball of claim 1, wherein g(x) is an elliptical function.

6. The golf ball of claim 1, wherein g(x) is a polynomial function.

7. The golf ball of claim 1, wherein g(x) is a trigonometric function.

8. The golf ball of claim 1, wherein b(x) is selected from the group consisting of spherical, conical, catenary, elliptical, polynomial, and trigonometric functions.

9. The golf ball of claim 1, wherein b(x) is selected from the group consisting of Witch of Agnesi, frequency, Neiles parabola, and trigonometric functions.

10. The golf ball of claim 1, wherein ƒ(x) is a continuous and differentiable function.

11. The golf ball of claim 1, wherein b(x) is a spherical function.

* * * * *